US006498864B1

(12) United States Patent
Roseman et al.

(10) Patent No.: US 6,498,864 B1
(45) Date of Patent: Dec. 24, 2002

(54) APPARATUS FOR AUTHENTICATING PRODUCTS AND AUTHORIZING PROCESSES USING THE MAGNETIC PROPERTIES OF A MARKER

(76) Inventors: Morton F. Roseman, 178 Hunington Park Drive, Thornhill, Ontario (CA), L3T 7JB; Mark A. Roseman, 1106-2000 Reu St-Marc, Montreal, Quebec (CA), H3H 2N9

( * ) Notice: Subject to any disclaimer, the term of this patent is extended or adjusted under 35 U.S.C. 154(b) by 0 days.

(21) Appl. No.: 09/412,522

(22) Filed: Oct. 5, 1999

(51) Int. Cl.[7] ............................ G06K 9/00; G06K 9/46; G07F 7/00; B07C 5/344; G05B 19/00

(52) U.S. Cl. ........................ 382/207; 382/138; 194/213; 209/567; 340/5.8

(58) Field of Search ................................ 382/100, 119, 382/124, 128, 131, 135, 136, 137, 139, 140, 175, 182, 187, 189, 207, 314, 315, 320, 138; 340/551, 552, 571, 572.1, 572.4, 5.8, 5.86; 194/210, 213, 317, 318, 325; 209/534, 535, 567; 235/449; 283/72; 324/239

(56) References Cited

U.S. PATENT DOCUMENTS

| | | | | | |
|---|---|---|---|---|---|
| 3,599,771 | A | * | 8/1971 | Hinterstocker | 194/318 |
| 4,437,558 | A | * | 3/1984 | Nicholson et al. | 194/325 |
| 4,714,124 | A | * | 12/1987 | Laib | 180/168 |
| 5,439,089 | A | * | 8/1995 | Parker | 194/317 |
| 5,808,466 | A | * | 9/1998 | Ibarrola et al. | 324/239 |
| 6,289,141 | B1 | * | 9/2001 | Roseman | 382/320 |

* cited by examiner

*Primary Examiner*—Joseph Mancuso
*Assistant Examiner*—Mehrdad Dastouri
(74) *Attorney, Agent, or Firm*—Shoemaker and Mattare

(57) ABSTRACT

The authenticity of an item which is one of a group of such items can be determined by attaching to or incorporating into each such item an authentication marker, all such markers interacting substantially identically with a given magnetic field. A field generating apparatus is provided which incorporates a reference sample that interacts with the given magnetic field in the same way as the authentication markers do. The field generating apparatus subjects both the reference sample and a candidate authentication marker to substantially identical magnetic search fields. A receiver apparatus detects the signals resulting from the interactions of the reference sample and the candidate marker with their respective magnetic search fields, so that, with the candidate marker positioned at a predetermined location with respect to the field-generating apparatus, substantially identical magnetic fields can be generated around the reference sample and the candidate marker, whereupon the receiver apparatus detects the signals. Comparing means are provided for comparing the signals to determine the authenticity of the candidate marker.

In a preferred form, the field-generating apparatus and the receiver apparatus both include portions of an H-shaped ferromagnetic core. The field generating apparatus includes a coil encircling the cross bar of the H, while the receiver apparatus includes first and second receiver coils respectively encircling opposite ends of one of the upright bars of the H. The receiver coils are wired in series such that their signals cancel if the reference sample is identical to the candidate authentication marker.

2 Claims, 3 Drawing Sheets

APPARATUS FOR AUTHENTICATING PRODUCTS AND AUTHORIZING PROCESSES USING THE MAGNETIC PROPERTIES OF A MARKER

This invention relates generally to the authentication of products such as paper money, brand name products, documents, etc., using the magnetic properties of a marker joined to or incorporated in the product.

BACKGROUND OF THIS INVENTION

The counterfeiting of products and documents is a widespread problem and results in many billions of dollars in losses to legitimate business. In an attempt to combat counterfeiters, many different authentication techniques have been developed and are in use today. These vary according to the target product, but all depend upon the addition of a unique marker that is difficult to copy but whose authenticity may be verified easily. When this marker is authenticated, the product to which it belongs is also authenticated. The list of technologies applied to this problem includes various kinds of complex printing with overt or covert information, holograms, embedded materials and chemicals in trace amounts, magnetic additives, etc. All employ a specially manufactured material (i.e. the marker) that is attached either permanently or via a tag or a label to the true product.

A proper authentication system has other uses. Besides providing a method of verifying the authenticity of a product in the field, it can be used to establish a distinction between real and counterfeit products for legal purposes. When coupled to an actuator, it can also control processes such as photocopying, faxing and data transmission.

Unfortunately, current authentication technologies are not without their weaknesses. Usually, they can be copied over time, so that there is a recurring need for greater sophistication. In addition, since many such techniques rely only on visual inspection for verification, human error or lack of training becomes a significant consideration. Other technologies require specialized equipment for verification and may be too expensive, cumbersome or slow to be effective in many situations.

Therefore, an ideal authentication technology a) gives authentication information that can be detected swiftly and unambiguously in an objective manner, b) is difficult to copy yet simple to implement, c) can be developed easily to more sophisticated levels of complexity that are more difficult to defeat, and d) is compatible with existing methods of manufacturing, marking or labelling goods.

In my earlier patent application Ser. No. 09/198,280, filed on Nov. 24, 1998, and entitled "Apparatus for Authenticating Products and Authorizing Processes Using the Magnetic Properties of a Marker", there is described an authentication system based upon the measurement of certain magnetic properties of ferromagnetic materials, with an electronic reader that detected the presence of the marker by means of an electromagnetic search field. This patent describes a unique reader that is suitable for this authentication system.

TECHNICAL DISCUSSION

A discussion of the technical background of the present invention can be found in my above-mentioned patent application Ser. No. 09/198280. However, in order to appreciate the innovative features of this particular reader, it is useful to examine the two major factors that degrade its performance. These are (1) the earth's magnetic field and (2) the strength of the magnetic search field as seen by the marker.

It is obvious that the effectiveness of the authentication function depends critically upon the degree to which the marker signal is unique and can be accurately determined. We can assume that it is possible to manufacture the marker with uniform magnetic properties. We can also assume that a reader can be built to any desired degree of accuracy if cost is no barrier. However, we are faced with another problem. Because the measurement requires that a magnetic search field interact with the magnetic marker to produce the unique response, any external magnetic field will affect the readings.

One such pervasive field is the earth's magnetic field, which is found everywhere, although it differs in strength and direction depending upon geographical location. In order for the reader to operate to its full potential, all measurements should be independent of the earth's magnetic field.

A more serious problem is that the response of the magnetic marker to the strength of the search field is non-linear and can change very dramatically with different measurement geometries. This severely limits the effectiveness of the measurement of magnetic properties.

Consider the case of a marker made of low coercivity amorphous steel ribbon oriented in the direction of a time varying magnetic field (i.e. parallel to the magnetic flux lines), so that maximum magnetic coupling occurs between it and the flux. At some field strength, the marker will saturate and a clear, characteristic pulse will be created as it goes from saturation in one direction to saturation in the other. However, if the same marker is then oriented at right angles to the same field, minimum magnetic coupling will occur and a small or non-existent pulse will result. At intermediate positions, other responses will be observed. This shows that the amplitude and shape of the response is also a function of the orientation of the marker within the field.

A reader that measures the magnetic properties of a marker in this manner will have to deal with many different shapes of the measured signal. Therefore, such a system cannot provide an acceptable authentication function.

This invention overcomes the aforementioned problems in a simple but effective manner. It does this by adding to the measurement system a standard or reference sample to which the authentication marker can be compared and ensuring that the measurement conditions for the reference and the marker are identical in virtually all important respects. By orienting the reference sample and the authentication marker identically during the measurement with respect to the earth's magnetic field, those effects are cancelled out. By orienting and positioning both the reference sample and the authentication marker identically (or very close to identically) with respect to identical search fields during the measurement, the measurement conditions are identical. When the responses from two matched markers are subtracted, a "null condition" is obtained and authentication is confirmed.

In practice, it may be impossible to achieve a perfect null, because of subtle differences between the reference sample and the authentication marker. If there is always a residual signal even under the best measurement conditions, the acceptance threshold can be set accordingly.

Due to the simple nature of the measurement, it is possible to use magnetic search fields of different frequencies, duty cycles, waveforms, etc.. This enhances the effectiveness of the authentication process, as it is now possible to choose those search field characteristics that optimize the measurement of the unique properties of a given marker.

GENERAL DESCRIPTION OF THIS INVENTION

In this invention, a field-generating apparatus generates the electromagnetic search field and a receiver apparatus looks for the response from a candidate marker and only that marker and produces an alarm signal when the characteristic response is found. The detection and decision making process is both automatic and objective. The details of the process are as follows.

In addition to the field generating, detecting and analysing circuitry, the measurement apparatus contains a sample of the authentication marker, the reference sample. Both materials (i.e. authentication marker and reference sample) are selected from the same source, such as the same manufacturing batch or process, so that the responses are functionally identical under a wide range of measurement conditions. The measurement apparatus is designed so that both the reference sample and the candidate marker are subjected to essentially identical search fields (i.e. measurement conditions). When the candidate marker is present in the correct position and the responses to these search fields are compared, the lack of a signal (i.e. the presence of a null signal) indicates that a match has been found and that the authenticity of the marker and therefore the object is verified. If no candidate marker is present, a large signal generated by the reference marker is observed.

With this apparatus, the choice of materials used in the candidate marker and the reference sample is determined only by their magnetic properties. Virtually any combination of ferromagnetic materials may be employed and there is no limit to the number of different samples of ferromagnetic material that can be combined in one marker. The design of the reader is such that at any time the reference sample may be changed, thereby changing the target marker. In addition, the waveform of the electromagnetic search field is limited only by the response characteristics of the marker material. Thus, sinusoidal, square, triangle and other complex waveforms may be employed for this measurement. This provides a migration path to increased complexity.

Successful authentication of an object may be signified by an audible or visible alarm, by a wire or wireless transmission to a remote station, or merely stored in a memory for future analysis.

For accurate measurements, the reading face must be properly oriented and located with respect to the authentication label, so that both the authentication marker and the reference sample experience the same external electromagnetic field. An automatic field strength adjustment can be added to the apparatus to compensate for some mismatch in positioning.

If the apparatus is set to high sensitivity, the reading process may take several seconds, as different positions and orientations of the apparatus with respect to the authentication label are tried out in order to find the best spot. If it is desired, a lower sensitivity setting may be employed to speed up the measurement process. A higher sensitivity setting will increase discrimination. Different waveform shapes and frequencies may be chosen to improve the differentiation between materials.

The advantages of this invention lie in its high reading accuracy, flexibility with respect to signal frequency and waveform, adaptability to use almost any low coercivity based magnetic marker and adjustable sensitivity to meet external conditions. These features make it suitable for many products, such as currency, documents, clothing, videos, CD's, toys, perfumes, industrial parts, etc. and objects made of metal, plastics, papers, etc.

More particularly, this invention provides a method for establishing the authenticity of an item which may or may not be one of a group of such items, each such item having attached thereto or incorporated therein an authentication marker, all of such markers being such as to interact substantially identically with a given magnetic field, the method comprising:

providing a field-generating apparatus which includes a reference sample having a structure and magnetic characteristics to which all said authentication markers should conform, the field-generating apparatus being adapted to subject both the reference sample and a candidate authentication marker to substantially identical magnetic search fields, providing receiver apparatus for detecting the signals resulting from the interactions of the reference sample and the candidate marker with their respective magnetic search fields, positioning the candidate marker at a predetermined location with respect to the field-generating apparatus, using the field-generating apparatus to generate substantially identical magnetic fields around the reference sample and the candidate marker, using the receiver apparatus to detect the said signals, and comparing the signals to determine the authenticity of the candidate marker.

Furthermore, this invention provides, for establishing the authenticity of an item which is one of a group of such items, wherein there is attached to or incorporated into each such item an authentication marker, all of such markers being such as to interact substantially identically with a given magnetic field, the ombination of:

a field-generating apparatus which includes a reference sample adapted to interact with said given magnetic field in the same way as said authentication markers do, the field-generating apparatus being adapted to subject both the reference sample and a candidate authentication marker to substantially identical magnetic search fields, receiver apparatus for detecting the signals resulting from the interactions of the reference sample and the candidate marker with their respective magnetic search fields, such that, with the candidate marker positioned at a predetermined location with respect to the field-generating apparatus, substantially identical magnetic fields can be generated around the reference sample and the candidate marker, so that the receiver apparatus detects the said signals, and comparing means for comparing said signals to determine the authenticity of the candidate marker.

GENERAL DESCRIPTION OF DRAWINGS

One embodiment of this invention is illustrated in the accompanying drawings, in which like numerals denote like parts throughout the several views, and in which.

DETAILED DESCRIPTION OF THE DRAWINGS

Figure 1:
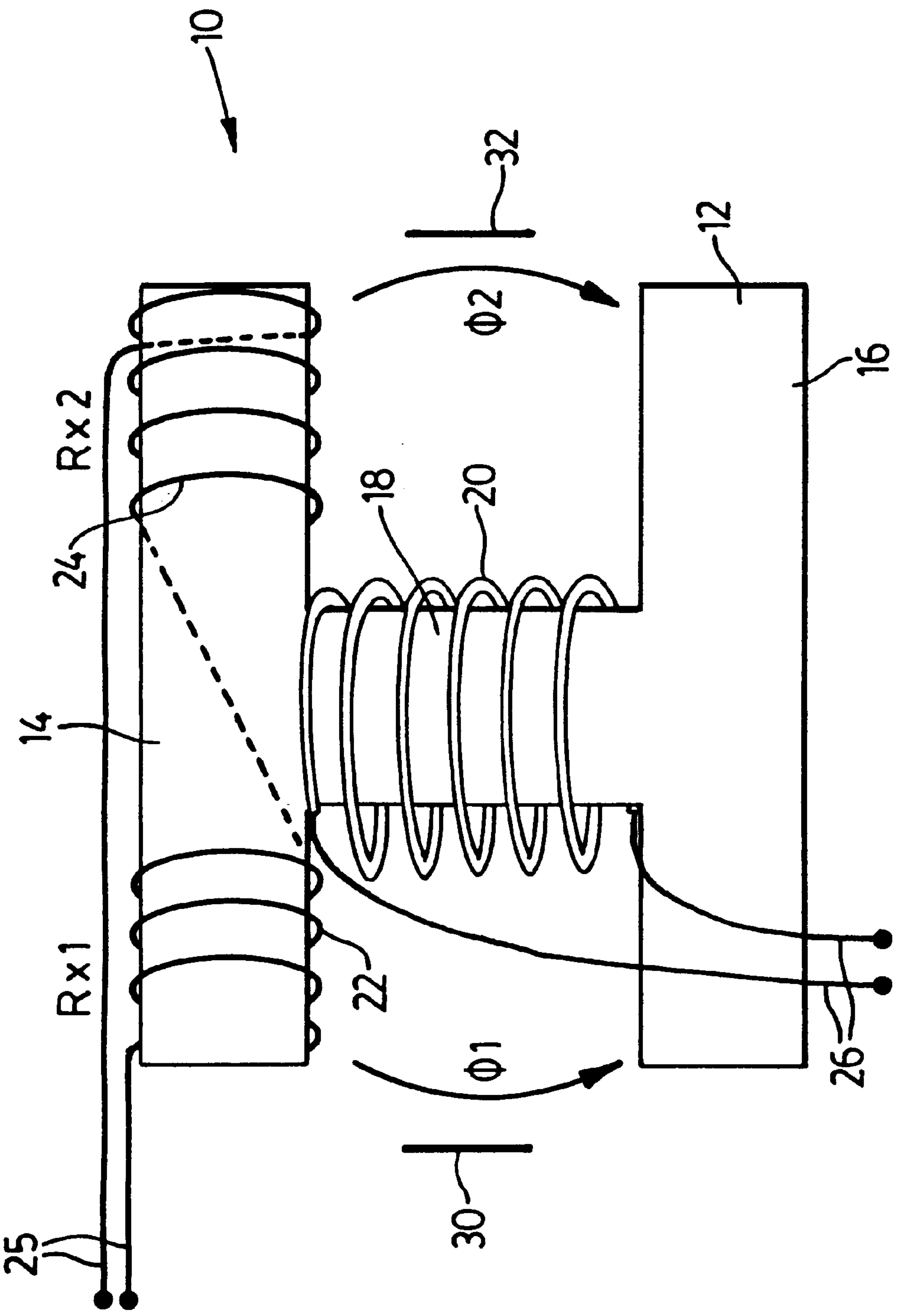
FIG. 1 is an elevational view of the core component of the apparatus embodying this invention.

In FIG. 1 there is illustrated what may be called a transducer 10, which includes a generally H-shaped core 12, made of a material of high magnetic permeability such as ferrite. The H-shaped core 12 includes two parallel bars 14 and 16 of equal length and section, joined by a cross-bar 18 at their mid-points. (If the core were rotated through 90° to bring the bars 14, 16 to an upright position, the cross-bar 18 would be horizontal.). The H-shaped core material has uniform magnetic properties. The two parallel bars, 14 and 16, have uniform cross sections.

A transmitting coil 20 is wound around the cross bar 18, while two receiving coils 22, 24 are would around the opposite ends of the bar 14.

Assuming that the receiving coils 22 and 24 are identical, and are identically located on the bar 14, in terms of their distance from the cross bar 18, it will be recognized that the core is constructed to be symmetrical about a hypothetical vertical line passing through the centre of the cross bar 18. Each end of the core is now in the shape of a "U", with the transmitting coil wound around the bottom leg of the "U" (part of the cross bar 18), and the corresponding receiving coil 22, 24 wound around one of the vertical members of the "U".

By applying a voltage signal across the leads 26 of the transmission coil 20, the geometric configuration of the various parts creates a first magnetic field $\phi_1$ in the form of a standing field between the leftward ends of the bars 14, 16, and creates a substantially identical field $\phi_2$ across the rightward ends of the bars 14, 16.

In FIG. 1, the vertical line 30 designates the position of a reference sample 30 which is located and held in a specific geometric position with respect to the leftward ends of the bars 14, 16.

At the rightward end of the transducer 10, an upright line 32 designates a candidate authentication marker of which the location geometry with respect to the rightward ends of the bars 14, 16 is the same (though mirror-image reversed) as that of the reference sample 30 with respect to the leftward ends of the bars 14, 16.

It will be understood that both the reference sample and the candidate authentication marker have the same magnetic, physical and geometric properties and are placed at right angles to the bars 14 and 16. They are also placed identically with respect to the ends of the bars 14 and 16, such that each one "sees" the same magnetic fields $\phi_1$ and $\phi_2$.

The interaction of the reference sample 30 and the candidate authentication marker 32 will have an effect on the voltage generated in the receiving coils 22 and 24. However, by making the coils 22, 24 identical, and by placing them at equivalent spacing from the cross bar 18, they can be wired in such a way that their signals interact to cancel each other out when the candidate authentication marker 32 is the same as the reference sample 30.

With the geometric arrangement illustrated in FIG. 1, it will be appreciated that the electromagnetic search fields created at either end of the transducer have essentially the same orientation with respect to the earth's magnetic field. This will mean that the operation of the transducer 10 is entirely or substantially independent of the position of the core with respect to the flux lines of the earth's magnetic field.

Figure 2:
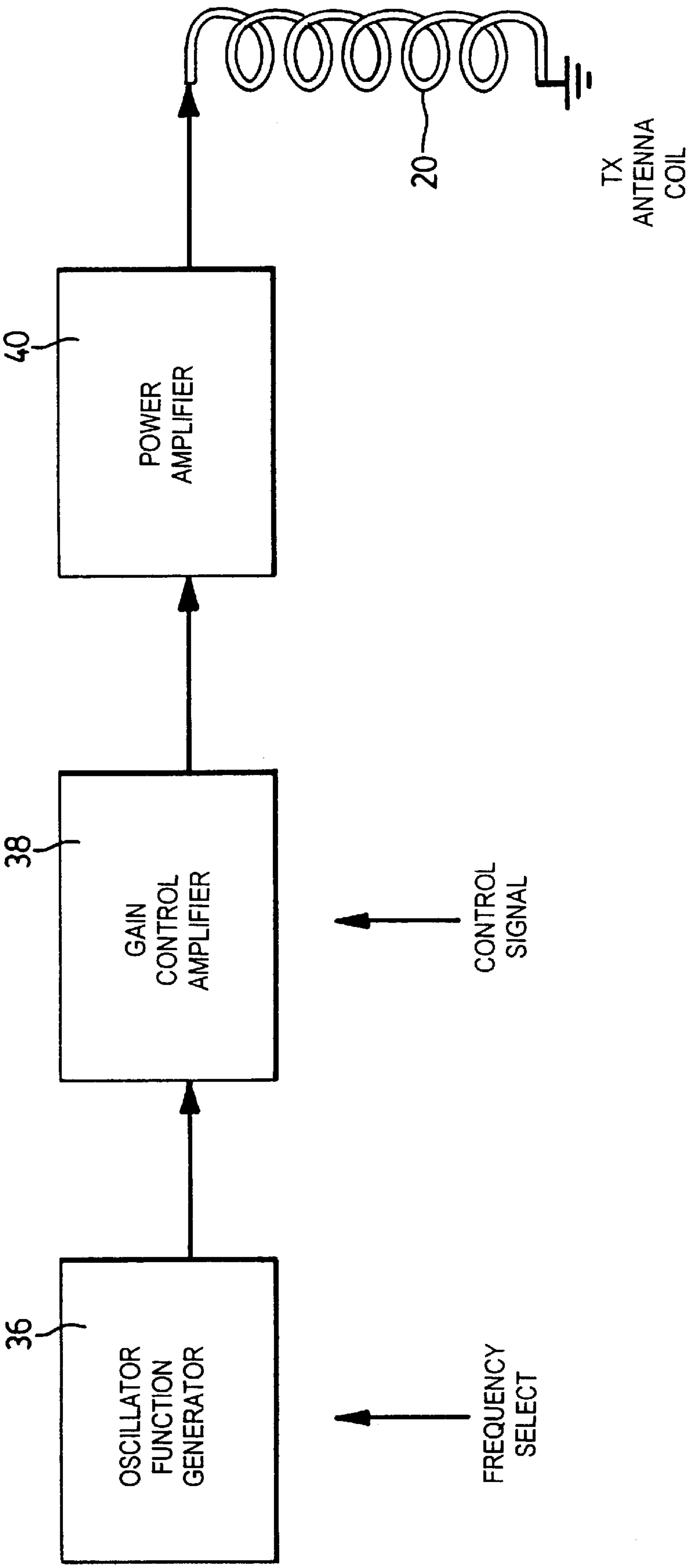
FIG. 2 is a schematic circuit diagram, showing major features.

Attention is now directed to FIG. 2, which is a block diagram illustrating the transmitter circuit. As seen in FIG. 2, an oscillator 36 generates a voltage signal of an appropriate frequency. The signal may be a square wave, a sine-wave, a sawtooth wave or any other suitable wave shape. The signal from the oscillator 36 passes through a gain control amplifier 38, and thence through a power amplifier 40. The signal from the power amplifier 40 is then applied to the leads 26 of the transmission coil 20 (see FIG. 1).

Figure 3:
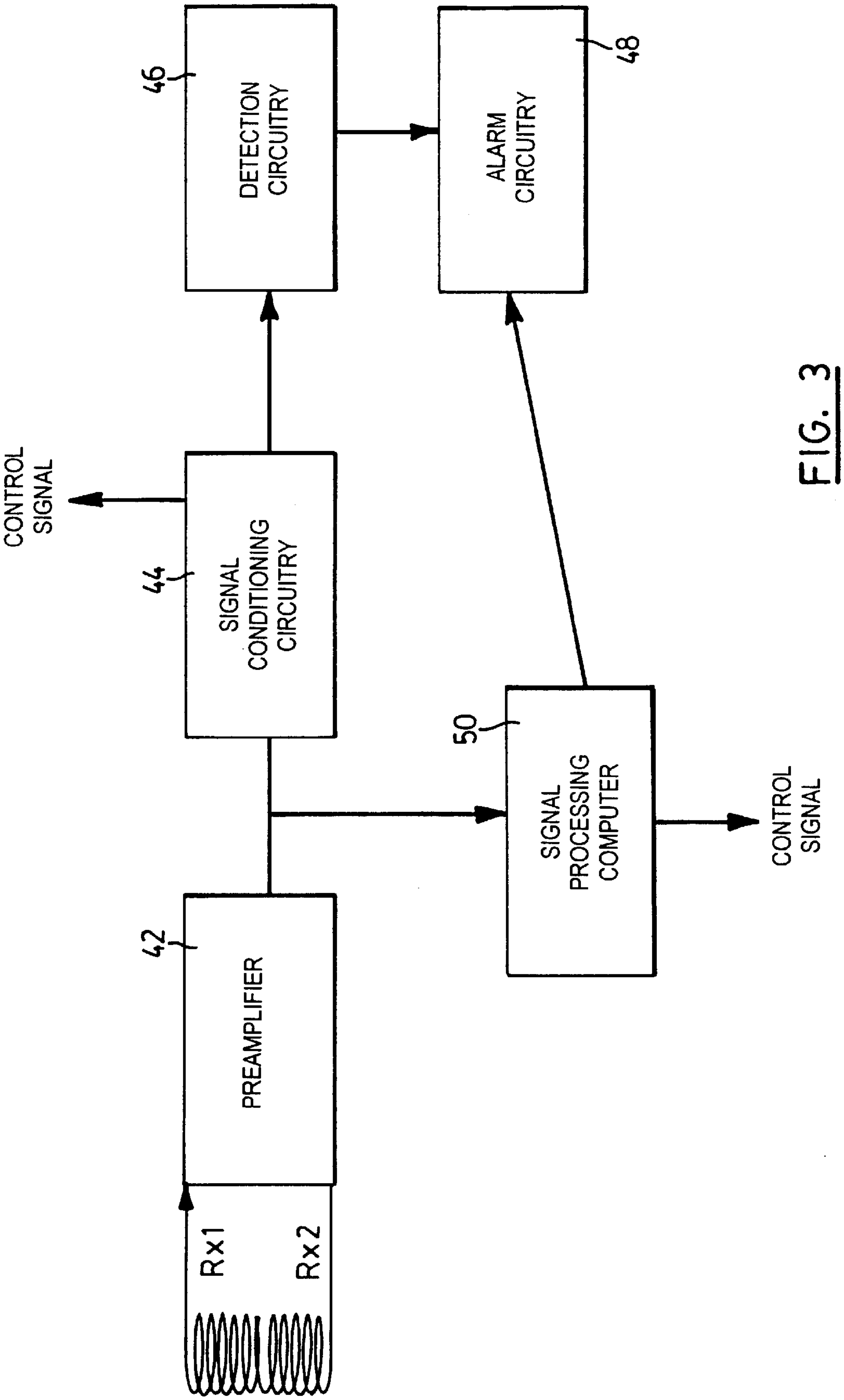
FIG. 3 is a block diagram of the receiver apparatus forming part of this invention.

Attention is now directed to FIG. 3, which shows that the sum of the signals from the receiving coils 22 and 24 is fed to a preamplifier 42, thence to a signal conditioning circuit 44, thence to detection circuitry 46, thence to alarm circuitry 48.

A further circuit loop proceeds from the signal generated by the preamplifier 42, and goes to a signal processing computer 50, which produces a control signal.

From the foregoing disclosure it will be appreciated that there is provided a method for establishing the authenticity of an item which may or may not be one of a group of such items, in which each such item has attached to it or incorporated into it an authentication marker, all of said authentication markers being substantially identical, so as to interact substantially identically with a given magnetic field. An example would be a 20 dollar bill, which has, applied to one face thereof, a small ferromagnetic patch capable of interacting with a surrounding magnetic field. The transducer 10 would contain a built-in reference sample (30) identical in all respects to the patch on the 20 dollar bill. The transducer would be part of a component adapted to receive a "candidate" 20 dollar bill, in order to determine whether it is a counterfeit bill. Structure would be supplied to hold the candidate 20 dollar bill in exactly the right position to bring its ferromagnetic patch into contact with the field $\phi_2$ so as to exactly conform to the position of the reference sample 30 in the field $\phi_1$. If the two patches are identical in terms of their magnetic interaction, then the two receiving coils 22 and 24 would react identically, so that their signals would cancel, leaving a null signal on the leads 25.

It will be appreciated that the localized magnetic fields around the reference sample and the candidate authentication marker can be considered as parts of a single (though complex) magnetic field generated by the H-shaped coil 12, and resulting from the activation of the transmission coil 20. Alternatively, it is possible to regard the field around the reference sample 30 as different from or separate from the field around the candidate authentication marker 32. The respective fields could be separated in reality, by splitting the core along the axis of the cross bar 18, and providing two identical loops similar to the loop 20, and wrapping one loop around each part of the cross bar 18 (the bases of the two U-shaped cores). It will be appreciated, however, that by retaining the H-shape shown in FIG. 1, with the built-in reference sample 30 at a given position, there is no concern that the localized earth's magnetic field will cause a false reading to be obtained at the leads 25.

While one embodiment of this invention has been illustrated in the accompanying drawings and described hereinabove, it will be evident to those skilled in the art that changes and modifications may be made therein without departing from the essence of this invention, as set forth in the appended claims.

The embodiments of the invention in which as exclusive property or privilege is claimed are defined as follows:

1. A device for establishing the authenticity of an item which has attached thereto or incorporated therein one of a plurality of authentication markers, any of which interacts in the same predetermined way with a given magnetic field, the device comprising:

a field-generating apparatus which includes a reference sample adapted to interact with said given magnetic field in the same way as said authentication markers do, the field-generating apparatus being adapted to subject both the reference sample and a candidate authentication marker to substantially identical magnetic search fields, a receiver apparatus for detecting the signals resulting from the interactions of the reference sample and the candidate marker with their respective magnetic search fields, such that, with the candidate marker positioned at a predetermined location with respect to the field-generating apparatus, substantially identical magnetic fields can be generated around the reference sample and the candidate marker, so that the receiver apparatus detects the said signals, and comparing means for comparing said signals to determine the authenticity of the candidate marker, in which the field-generating apparatus and the receiver apparatus include portions of an H-shaped ferromagnetic core, the field-generating apparatus including a coil encircling the horizontal mid-bar of the H, the receiver apparatus including first and second receiver coils respectively encircling opposite ends of one of the upright bars of the H, the receiver coils being wired in series such that, if the candidate marker is positioned generally at a location between first adjacent ends of the upright bars of the H-shaped core, and if the reference sample is substantially identical with the candidate marker and is positioned generally at an opposed but corresponding location between the second adjacent ends of the upright bars of the H-shaped core, the signals arising in the receiver coils will substantially cancel one another.

2. The combination claimed in claim 1, further including a preamplifier for receiving and amplifying the output of the series-wired receiver coils.

* * * * *